United States Patent [19]

Nelson et al.

[11] 4,296,019

[45] * Oct. 20, 1981

[54] SOLVENT BLENDS FOR ETHYLENE COPOLYMERS

[75] Inventors: Alfred R. Nelson, Edenville; Kenneth E. Johnsen, Midland, both of Mich.

[73] Assignee: The Dow Chemical Co., Midland, Mich.

[ * ] Notice: The portion of the term of this patent subsequent to Jul. 21, 1998, has been disclaimed.

[21] Appl. No.: 98,465

[22] Filed: Nov. 29, 1979

[51] Int. Cl.$^3$ ............................................... C08K 5/05
[52] U.S. Cl. ...................... 260/33.4 R; 260/33.6 UA; 260/33.8 UA
[58] Field of Search ................... 260/33.4 R, 33.4 PQ, 260/33.8 UA

[56] References Cited

U.S. PATENT DOCUMENTS

| 3,560,455 | 2/1971 | Hazen | 260/33.8 UA |
| 3,560,456 | 2/1971 | Hazen | 260/33.8 UA |
| 3,560,457 | 2/1971 | Hazen | 260/33.8 UA |
| 3,711,456 | 1/1973 | Gilbert | 260/33.8 UA |
| 3,755,272 | 8/1973 | Blank | 260/33.4 R |
| 3,814,737 | 6/1974 | Gilbert | 260/33.4 R |
| 3,904,796 | 9/1975 | Zorn | 260/33.4 R |
| 3,935,135 | 1/1976 | Dollhausen | 260/33.8 UA |
| 4,156,671 | 5/1979 | Keown | 260/33.8 UA |

OTHER PUBLICATIONS

Polymer, Handbook, Brandrup & Immergut, 2nd edition, John Wiley & Sons, New York, 1975, pp. IV 246 and 248.

Primary Examiner—Paul R. Michl

[57] ABSTRACT

A solvent blend capable of dissolving at a temperature of at least 60° C. copolymers of ethylene and ethylenically unsaturated carboxylic acid. The solvent blend comprises from about 5 to about 35 percent by weight of an acyclic alcohol having from 2 to 12 carbon atoms, based upon the total weight of said solvent blend, about 3 percent to about 90 percent by weight of a monocyclic aromatic hydrocarbon, based upon the total weight of said solvent blend, and from about 5 to about 92 percent by weight of a halogenated $C_2$ hydrocarbon, based on the total weight of said solvent blend. An exemplary solvent blend contains about 10 percent by weight of isopropanol, about 80 percent by weight of perchloroethylene, and about 10 percent by weight of toluene, based on the total weight of the solvent blend.

9 Claims, No Drawings

SOLVENT BLENDS FOR ETHYLENE COPOLYMERS

BACKGROUND OF THE INVENTION

This invention relates to solvents for ethylene copolymers. In one aspect, this invention relates to solvent blends for copolymers of ethylene and ethylenically unsaturated carboxylic acid. In another aspect, this invention pertains to solvent blends which will hold such copolymers in solution at a temperature of about 60° C.

Copolymers of ethylene and ethylenically unsaturated carboxylic acid are well known, and a number of such copolymers are commercially available. Further, such copolymers are characterized, among other things, by their outstanding adhesion to a variety of metallic and non-metallic substrates, outstanding toughness and tensile strength. Because of these unique properties, such copolymers find commercial utility, among others, in packaging, building products, communications and transportation end use applications. It has been found that a most important property of such copolymers is their adhesive characteristics. Thus, such copolymers are used widely as adhesive for laminating two or more substrates into a laminate. In a dry film lamination technique, the copolymers are first converted into dry adhesive films then placed between two substrates to form an intimate bond under heat and pressure. In an extrusion lamination technique, a molten coating of copolymer is extruded into a nip of two substrates to form a laminate. In an adhesive lamination technique, a solution or an aqueous dispersion of copolymer is first coated unto a substrate using a roll coater. The solvent or water is then dried off and the dried, coated substrate comes in contact with another substrate under pressure to form a laminate. When an adhesive lamination technique is involved, it is important to have an effective solvent system for copolymers. More specifically, an effective solvent system is needed to dissolve the copolymer in an adhesive solution. Still another need is an effective solvent system capable of cleaning applicator rolls (e.g. gravure rolls) and other laminating equipment which handles copolymer solutions or dispersions at an elevated temperature.

Tachi et al. (Kogyo Kagaku Zasshi 73(2), 398-42 (1970)) discloses the solubility of ethylene/acrylic acid copolymers in organic solvents, including mixed solvents. Tetrahydrofuran and certain mixed solvents (e.g. cyclohexane and dioxane) can dissolve the copolymer at 60° C. However, none of these single solvents or mixtures suggest the ternary solvent blends of the present invention. German OLS No. 2,814,030 discloses a solution of graft ethylene acrylic acid at elevated temperatures in organic solvents such as cyclohexane to prepare "suspensions" of fine (insoluble) particles at cooler temperatures. Cyclohexane at an elevated temperature is used. There is no suggestion of the ternary solvent blends of the present invention. U.S. Pat. No. 3,711,456 discloses a method for the preparation of ethylene carboxylic acid polymers having improved optical properties. Such polymers are obtained by intimately contacting a normally solid random copolymer with a "polyethylene" solvent at elevated temperature, and thereafter separating the solvent from the solid ethylene polymer. The low molecular weight crystalline, low acrylic acid portion of the ethylene carboxylic acid copolymer is selectively extracted at elevated temperatures. Only single solvents are used. U.S. Pat. No. 3,814,737 discloses the use xylene/acetic acid and xylene/isopropanol as solvent mixtures for ethylene carboxylic acid copolymers at elevated temperatures. The temperature involved exceeds 100° C. Further, binary solvent mixtures are used. U.S. Pat. No. 3,554,957 discloses a solvent system for copolymers of ethylene and acrylic acid which will maintain the copolymer in solution at substantially normal room temperature. The solvent system comprises between about 55 and about 65 percent by weight toluene, based upon the total weight of the solvent blend, and between about 35 and about 45 percent by weight tetrahydrofuran, based upon the total weight of the solvent blend. The copolymer can be dissolved and held in solution at normal room temperature in amounts up to about 5 percent by weight based upon the total weight of the solution. However, the solvent system of this patent is ecologically "unclean."

Accordingly, it is an object of this invention to provide a solvent system for copolymers of ethylene and ethylenically unsaturated carboxylic acid which is effective at a temperature of about 60° C. Another object of this invention is to provide a solvent system which is ecologically "clean." It is yet another object of this invention to provide a solution containing a dissolved copolymer of ethylene and ethylenically unsaturated carboxylic acid which can be applied or deposited at a temperature of 60° C. Other objects and advantages of the invention will become apparent in the following description.

SUMMARY OF THE INVENTION

The objects of this invention are obtained by a solvent blend capable of dissolving at a temperature of 60° C. a copolymer of ethylene and ethylenically unsaturated carboxylic acid having from about 2.5 to about 30 percent by weight of said carboxylic acid based upon the total weight of said copolymer. The solvent blend comprises from about 5 to about 35 percent by weight of an acyclic alcohol having from 2 to 12 carbon atoms, based upon the total weight of said solvent blend, about 3 percent to about 90 percent by weight of a monocyclic aromatic hydrocarbon, based upon the total weight of said solvent blend, and from about 5 to about 92 percent by weight of a halogenated $C_2$ hydrocarbon, based on the total weight of said solvent blend.

The term "soluble or dissolving" as used herein means a solvent blend having a solubility rating of 2 or less as defined in Table I.

DETAILED DESCRIPTION AND EMBODIMENTS

The polymer which is beneficially used in accordance with this invention is a normally solid thermoplastic polymer of ethylene modified by monomers having reactive carboxylic acid groups, particularly a copolymer or a major proportion of ethylene and a minor proportion, typically from 2.5 to 30 percent, preferably 3 to 20 percent by weight, of an ethylenically unsaturated carboxylic acid, and an ionic metal salt thereof commonly known as an "ionomer." Specific examples of such suitable ethylenically unsaturated carboxylic acids (which term includes mono- and polybasic acids, acid anhydrides, and partial esters of polybasic acids) are acrylic acid, methacrylic acid, crotonic acid, fumaric acid, maleic acid, itaconic acid, maleic anhydride, monomethyl maleate, monoethyl maleate, monomethyl fumarate, monoethyl fumarate, tripropylene glycol monomethyl ether acid maleate, or ethylene glycol monophenyl ether acid maleate. The carboxylic acid monomer is preferably selected from $\alpha,\beta$-ethylenically unsaturated mono- and polycarboxylic acids and acid anhydrides having from 3 to 8 carbon atoms per molecule and partial esters of such polycarboxylic acid wherein the acid moiety has at least one carboxylic acid group and the alcohol moiety has from 1 to 20 carbon atoms. The copolymer may consist essentially of ethylene and one or more of such ethylenically unsaturated acid comonomers or can also contain small amounts of other monomer copolymerizable with ethylene. Thus, the copolymer can contain other copolymerizable monomers including an ester of acrylic acid. Methods of making such copolymer are readily known in the art.

The term "ionomer" as used herein means a copolymer of ethylene and ethylenically unsaturated carboxylic acid cross-linked with a metal ion. Na, Ca, Zn or another similar metal may be used. Ionomers are commercially available and methods of their manufacture are readily known in the art.

The alcohols used in connection with the present invention are acyclic alcohols having from 2 to 12 carbon atoms. Such alcohols may have either straight chain or branch chain carbon backbones. Alcohols having from 2 to 5 carbon atoms are particularly preferred. The alcohols may constitute from about 5 to about 35 percent by weight, preferably from about 7 to about 20 percent by weight, and most preferably from about 7 to about 15 percent by weight of the total weight of the solvents.

Monoacyclic aromatic hydrocarbons used in connection with the present invention may constitute at least 3 percent by weight of the total weight of the solvents. Toluenes and xylenes are particularly preferred.

The halogenated $C_2$ hydrocarbons of the present invention may constitute at least 5 percent by weight of the total weight of solvents. 1,1,1-Trichloroethane and perchloroethylene are particularly preferred.

The copolymers of the present invention can be dissolved in the solvent system described herein above and the resultant solution can be applied to various substrates using well known coating techniques as an adhesive or as a protective coating.

The solvent blends of the present invention are useful at a temperature of at least 60° C.; their utility is further enhanced at temperatures higher than 60° C.

The specific working examples that follow are intended to illustrate the invention but not to be construed as limiting its scope. In the examples, parts and percentages are by weight unless otherwise specified or required by the context.

EXAMPLE 1

Fifty grams of a ternary solvent blend consisting of 1,1,1-trichloroethane, isopropanol and toluene were prepared at various ratios shown in Table II in a two-ounce glass bottle. 2.5 Grams of an ethylene acrylic acid copolymer acrylic acid concentration: 20.5 percent by weight; melt index: 236 dg/min.) were added to the glass bottle. The bottle was tightly sealed with a Saran-lined cap and placed in a water bath maintained at a temperature of 60° C. The samples were vigorously agitated by hand for a period of about 10 seconds at five minute intervals for a period of about one hour. Each bottle was then rated at 60° C. in accordance with the rating scale in Table I.

TABLE I

| Rating | Solubility Rating Scale Remarks |
|---|---|
| 1 | Water white, no visible haze under ambient lighting conditions, no gels or particulates. |
| 2 | Clear, but with detectable haze; may also be water white (No. 1) but with some gels. |
| 3 | Homogeneous, but very hazy; almost translucent to opaque; may or may not have gel. |
| 4 | Nonhomogenous, two phases; one usually clear, the other viscous and opaque; no undissolved beads. |
| 5 | Little or no effect; beads may be partially attacked or swollen, but are essentially intact. |

TABLE II

Trichloroethane/Isopropanol/Toluene Blend

| Test No. | Trichloroethane (% by wt.) | Isopropanol (% by wt.) | Toluene (% by wt.) | Solubility Ratings |
|---|---|---|---|---|
| 2-1 | 15 | 15 | 70 | 1 |
| 2-2 | 70 | 15 | 15 | 1 |
| 2-3* | 25 | 50 | 25 | 4 |
| 2-4 | 90 | 5 | 5 | 2 |

*Not an example of this invention

EXAMPLE 2

The procedure of Example 1 was repeated with another ternary solvent blend consisting of perchloroethylene, isopropanol and toluene. The results are shown in Table III.

TABLE III

| Test No. | Perchloroethylene (% by wt.) | Isopropanol (% by wt.) | Toluene (% by wt.) | Solubility Rating |
|---|---|---|---|---|
| 3-1 | 90 | 7 | 3 | 1 |
| 3-2 | 10 | 10 | 80 | 1 |
| 3-3 | 40 | 20 | 40 | 1 |
| 3-4 | 45 | 35 | 20 | 1 |
| 3-5 | 10 | 10 | 80 | 1 |

EXAMPLE 3

The procedure of Example 1 was repeated with another ternary solvent blend consisting of trichloroethane, isopropanol, xylene. Solubility rating is shown in Table IV.

TABLE IV

Trichloroethane/Isopropanol/Xylene Blend

| Test No. | Trichloroethane (% by wt.) | Isopropanol (% by wt.) | Xylene (% by wt.) | Solubility Rating |
|---|---|---|---|---|
| 4-1 | 10 | 15 | 75 | 1 |
| 4-2 | 80 | 10 | 10 | 1 |

EXAMPLE 4

The procedure of Example 1 is repeated with another ternary solvent blend consisting of trichloroethane, ethanol, and toluene. The solubility rating is shown in Table V.

TABLE V

| Test No. | Trichloro-ethane (% by wt.) | Ethanol (% by wt.) | Toluene (% by wt.) | Solubility Rating |
|---|---|---|---|---|
| 5-1 | 10 | 15 | 75 | 2 |
| 5-2 | 40 | 20 | 40 | 2 |
| 5-3 | 80 | 10 | 10 | 2 |

EXAMPLE 5

The procedure of Example 1 was repeated with another ternary solvent blend consisting of perchloroethylene, isobutanol, toluene. The solubility ratings are shown in Table VI.

TABLE VI

| Test No. | Perchloro-ethylene (% by wt.) | Isobutanol (% by wt.) | Toluene (% by wt.) | Solubility Rating |
|---|---|---|---|---|
| 6-1 | 80 | 10 | 10 | 1 |
| 6-2 | 15 | 10 | 75 | 1 |
| 6-3 | 5 | 5 | 90 | 1 |
| 6-4* | 25 | 50 | 25 | 4 |

*Not an example of this invention

EXAMPLE 6

The procedure of Example 1 was repeated with another ternary solvent blend consisting of perchloroethylene, n-propanol, and toluene. The solubility rating is shown in Table VII.

TABLE VII

| Test No. | Perchloro-ethylene (% by wt.) | n-propanol (% by wt.) | Toluene (% by wt.) | Solubility Rating |
|---|---|---|---|---|
| 7-1 | 80 | 10 | 10 | 2 |
| 7-2 | 10 | 10 | 80 | 1 |

EXAMPLE 7

The procedure of Example 1 was repeated with another ternary solvent blend consisting of methylene chloride, isopropanol and toluene. The solubility rating is shown in Table VIII.

TABLE VIII

| Test No. | Methylene Chloride (% by wt.) | Isopropanol (% by wt.) | Toluene (% by wt.) | Solubility Rating |
|---|---|---|---|---|
| 8-1 | 10 | 10 | 80 | 1 |
| 8-2 | 50 | 10 | 40 | 2 |

EXAMPLE 8

The procedure of Example 1 was repeated with another ternary solvent blend consisting of perchloroethylene, t-butyl alcohol, and toluene. The solubility rating is shown in Table IX.

TABLE IX

| Test No. | Perchloro-ethylene (% by wt.) | t-Butanol (% by wt.) | Toluene (% by wt.) | Solubility Rating |
|---|---|---|---|---|
| 9-1 | 90 | 5 | 5 | 1 |
| 9-2 | 5 | 5 | 90 | 1 |
| 9-3 | 40 | 20 | 40 | 1 |

EXAMPLE 9

The procedure of Example 1 was repeated with another ternary solvent blend consisting of 80 percent by weight of perchloroethylene, 10% by weight of isopropanol and 10% by weight of toluene, based on the total weight of the solvent blend. In place of ethylene acrylic acid copolymer, various Surlyn ® ionomers were used as indicated in Table X.

TABLE X

| | Solubility of Ionomers | | |
|---|---|---|---|
| Ionomer | Melt Index | Metal ion | Solubility Rating @ 60° C. |
| Surlyn ® 1706 | 0.7 | Zn | 2 |
| Surlyn ® 1650 | 1.4 | Zn | 2 |
| Surlyn ® 1652 | 5.0 | Zn | 2 |
| Surlyn ® 1702 | 14.0 | Zn | 2 |
| Surlyn ® 1707 | 0.9 | Na | 1 |
| Surlyn ® 1555 | 10.0 | Na | 1 |

EXAMPLE 10

The procedure of Example 1 was repeated with a ternary solvent blend consisting of 15 percent by weight of trichloroethane/15% by weight of isopropanol/70% by weight of toluene. However various ethylene acrylic acid copolymers shown in Table XI was used.

TABLE XI

| Test No. | Amount of Acrylic Acid (% by wt.) | Melt Index | Solubility Rating @ 60° C. |
|---|---|---|---|
| 11.1 | 2.7 | — | 1 |
| 11.2 | 3.5 | 11 | 1 |
| 11.3 | 8.0 | 9 | 1 |
| 11.4 | 10.7 | — | 1 |
| 11.5 | 14.8 | 412 | 1 |
| 11.6 | 16.3 | 412 | 1 |
| 11.7 | 18.0 | 274 | 1 |
| 11.8 | 20.5 | 236 | 1 |
| 11.9 | 22.3 | 308 | 1 |
| 11.10 | 26.6 | 426 | 1 |

As shown in Examples 1-9, the ternary solvent blends of the present invention are effective in dissolving ethylene acrylic acid copolymers at a temperature of at least 60° C.

Table XI shows that the solvent blends of the present invention are effective at a temperature of at least 60° C. for ethylene acrylic acid copolymers having from about 2.7 to about 27 percent by weight of acrylic acid content.

In place of the particular solvent blends and copolymers used in the preceding examples, there can be used other solvent blends and ethylene carboxylic acid copolymers as hereinbefore described with substantially similar results.

While certain representative embodiments have been shown in detail for the purposes of illustrating the invention, it will be apparent to those skilled in the art that various changes and modifications can be made without departing from the spirit and scope of the present invention.

What is claimed is:

1. A solution comprising a solvent blend which comprises from about 5 to about 35 percent by weight of an acyclic alcohol selected from the group consisting of ethanol, propanol, isopropanol, n-butanol, isobutanol and t-butanol, based upon the total weight of said solvent blend, about 3 percent to about 90 percent by weight of a monocyclic aromatic hydrocarbon, based upon the total weight of said solvent blend, and from about 5 to about 92 percent by weight of a halogenated $C_2$ hydrocarbon, based upon the total weight of said solvent blend, and a copolymer of ethylene and ethylenically unsaturated carboxylic acid, or an ionic metal salt thereof, having from about 2.5 to about 30 percent by weight of said carboxylic acid, based on the total weight of said copolymer, characterized in that said copolymer remains dissolved at a temperature of at least 60° C.

2. A solution according to claim 1 wherein said copolymer is a random copolymer of ethylene and acrylic acid.

3. A solution according to claim 1 wherein said copolymer is cross-linked with a Na or Zn ion.

4. A solution according to claim 1 wherein said monocyclic aromatic hydrocarbon is benzene, toluene, or xylene.

5. A solution according to claim 1 wherein said halogenated $C_2$ hydrocarbon is 1,1,1-trichloroethane or perchloroethylene.

6. A solution comprising a solvent blend which comprises about 7 percent by weight of isopropanol, about 90 percent by weight of perchloroethylene, and about 3 percent by weight of toluene, based on the total weight of said solvent blend, and a copolymer or ethylene and ethylenically unsaturated carboxylic acid having from about 2.5 to about 30 percent by weight of said carboxylic acid, based on the total weight of said copolymer, characterized in that said copolymer remains dissolved at a temperature of at least 60° C.

7. A solution comprising a solvent blend which comprises about 5 percent by weight of tertiary butyl alcohol, about 90 percent by weight of perchloroethylene, and about 5 percent by weight of toluene, based on the total weight of said solvent blend, and a copolymer of ethylene and ethylenically unsaturated carboxylic acid having from about 2.5 to about 30 percent by weight of said carboxylic acid, based on the total weight of said copolymer, characterized in that said copolymer remains dissolved at a temperature of at least 60° C.

8. A solution comprising a solvent blend which comprises about 10 percent by weight of isopropanol, about 10 percent by weight of perchloroethylene, and about 80 percent by weight of toluene, based on the total weight of said solvent blend, and a copolymer of ethylene and ethylenically unsaturated carboxylic acid having from about 2.5 to about 30 percent by weight of said carboxylic acid, based on the total weight of said copolymer, characterized in that said copolymer remains dissolved at a temperature of at least 60° C.

9. A solution according to claim 6, 7 or 8 wherein said copolymer is a random copolymer of ethylene and acrylic acid.

* * * * *